(12) United States Patent
Iida

(10) Patent No.: US 7,450,401 B2
(45) Date of Patent: Nov. 11, 2008

(54) BIDIRECTIONAL DC/AC INVERTER

(75) Inventor: Takahide Iida, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/523,121

(22) Filed: Sep. 18, 2006

(65) Prior Publication Data

US 2007/0086222 A1 Apr. 19, 2007

(30) Foreign Application Priority Data

Oct. 17, 2005 (JP) ............................. 2005-301399

(51) Int. Cl.
*H02M 3/335* (2006.01)

(52) U.S. Cl. .............................. 363/16; 363/34; 363/97

(58) Field of Classification Search .................. 363/16, 363/34, 78, 79, 95, 97
See application file for complete search history.

(56) References Cited

U.S. PATENT DOCUMENTS 6,330,170 B1 * 12/2001 Wang et al. .................. 363/37
6,600,670 B2 * 7/2003 Morita et al. ................. 363/89

FOREIGN PATENT DOCUMENTS

| JP | 07322625 A | * 12/1995 |
| JP | 08-107607 | 4/1996 |
| JP | 2001-037226 | 2/2001 |

* cited by examiner

*Primary Examiner*—Adolf Berhane
(74) *Attorney, Agent, or Firm*—Morgan & Finnegan, LLP

(57) ABSTRACT

An input voltage Vc to a bridge circuit is made variable by making a switching element, which is on a lower side among a plurality of switching elements constituting the bridge circuit, a coil and a capacitor, which constitute a filter, operate as an active filters at the time of charging the battery.

10 Claims, 3 Drawing Sheets

BIDIRECTIONAL DC/AC INVERTER

BACKGROUND OF THE INVENTION

1. Field of the Invention

The present invention relates to a bidirectional direct current-to-alternate current (DC/AC) inverter, and in particular to a drive control method for a bidirectional DC/AC inverter at the time of charging a battery.

2. Description of the Related Art

FIG. 1 is a diagram showing a conventional bidirectional DC/AC inverter.

The bidirectional DC/AC inverter 30 shown by FIG. 1 comprises a filter 34 constituted by coils 31 and 32 and by a capacitor 33; a bridge circuit 39 constituted by four switching elements 35 through 38 and connected to the filter 34; a bridge circuit 45 constituted by four switching elements 41 through 44 and connected to the bridge circuit 39 by way of a capacitor 40; a bridge circuit 51 constituted by four switching elements 47 through 50 and connected to the bridge circuit 45 by way of a transformer 46; and a capacitor 53 and a coil 54 which are equipped between the bridge circuit 51 and a battery 52. Note that the switching elements 35 through 38, switching elements 41 through 44, and switching elements 47 through 50, are insulated gate bipolar transistors (IGBT) for example, with each of them being connected to a diode in parallel.

The above noted bidirectional DC/AC inverter 30 makes the switching elements 41 and 44 and switching elements 42 and 43 turn on and off alternatively in the case of charging the battery 52. That is, an alternate current (AC) power externally input to the bridge circuit 39 by way of the filter 34 is rectified by the diodes which are parallelly connected to the switching elements 35 through 38, respectively, of the bridge circuit 39 and also smoothed by the capacitor 40, thereby being converted into a direct current (DC) power in the case of charging the battery 52. Then the DC power is converted into an AC power by the bridge circuit 45 and is output to the bridge circuit 51 by way of the transformer 46. Then the AC power is rectified by the diodes which are parallelly connected to the switching elements 47 through 50, respectively, of the bridge circuit 51 and also is smoothed by the capacitor 53, thereby being converted into a DC power. Then the DC power is supplied to the battery 52 by way of the coil 54.

On the other hand, the above noted bidirectional DC/AC inverter 30 makes the switching elements 47 and 50 and switching elements 48 and 49 of the bridge circuit 51 turn on and off alternatively, and also makes the switching elements 35 and 38 and switching elements 36 and 37 of the bridge circuit 39 turn on and off alternatively in the case of externally outputting an AC power. That is, a DC power obtained from the battery 52 is converted into an AC power by the bridge circuit 51 and is output to the bridge circuit 45 by way of the transformer 46 in the case of outputting an AC power from the bidirectional DC/AC inverter 30. Then the AC power is rectified by the diodes parallelly connected to the switching elements 41 through 44, respectively, of the bridge circuit 45 and also is smoothed by the capacitor 40, thereby being converted into a DC power. Then, the DC power is converted into an AC power by the bridge circuit 39 and is output by way of the filter 34.

As described above, the above noted bidirectional DC/AC inverter 30 drives only the bridge circuit 45 at the time of charging the battery 52, while it drives only the bridge circuits 39 and 51 at the time of outputting an AC power (refer to a patent document 1 for example).

[Patent document 1] Laid-Open Japanese Patent Application Publication No. 2001-37226

Incidentally, a charging method for the battery 52 includes one for charging it while adjusting a charging voltage by controlling a current output from the bridge circuit 45 by making a duty of each the switching elements 41 through 44 of the bridge circuit 45 variable while maintaining an input voltage to the bridge circuit 45 approximately constant, for example. This method is applied for maintaining an input voltage to the battery 52 constantly a little higher than a terminal voltage of the battery 52 in the case of charging the battery 52 by a constant current for example. When increasing the input voltage to the battery 52 with the terminal voltage of the climbing terminal voltage of the battery 52, the duty of each of the switching elements 41 through 44 increases with the climbing terminal voltage of the battery 52.

However, in the method for charging the battery 52 by varying the input voltage thereto as described above, a current output from the bridge circuit 45 becomes small, resulting in decreased efficiency of a DC/AC power conversion of the bridge circuit 45 when the terminal voltage of the battery 52 is low and the duty of each of the switching elements 41 through 44 is accordingly small. Consequently, it is necessary to configure the bridge circuit 45 by using high performance switching elements which are capable of running a larger volume of current when the duty is small, in order to increase the DC/AC power conversion efficiency of the bridge circuit 45 by the application of the above described method, thus facing with a problem of a cost increase, et cetera.

SUMMARY OF THE INVENTION

Accordingly, the purpose of the present invention is to provide a bidirectional DC/AC inverter capable of avoiding a reduction of DC/AC power conversion efficiency in the case of charging a battery by varying an input voltage thereto, without using a high performance switching element.

The present invention adopts the following comprisal in order to solve the above described problem.

That is, a bidirectional DC/AC inverter according to the present invention comprises a first power conversion unit; a second power conversion unit; a third power conversion unit; and a control unit for controlling respective operations of the first through third power conversion units, wherein the first power conversion unit converts an inputted AC power into a DC power, and the second power conversion unit converts the immediately aforementioned DC power into an AC power, and the third power conversion unit converts the immediately aforementioned AC power into a DC power for supplying a battery at the time of charging said battery, the third power conversion unit converts a DC power obtained from the battery into an AC power, and the second power conversion unit converts the immediately aforementioned AC power into a DC power, and the first power conversion unit converts the immediately aforementioned DC power into an AC power at the time of outputting an AC power from the aforementioned bi-directional DC/AC inverter, and the control unit makes a switching element and a capacitor, which constitute the first power conversion unit, and a coil, which constitutes a filter which is connected to the first power conversion unit, operate as an active filter at least during a period of time in which a terminal voltage of the battery is equal to or greater than a predetermined voltage, thereby making an input voltage to the second power conversion unit variable at the time of charging the battery.

As described above, the configuration of making an input voltage to the second power conversion unit variable by having the switching element, which constitutes the first power conversion unit, the coil, and the capacitor, which is installed between the first and second power conversion units, operate as an active filter enables an input voltage to the third power conversion unit to be variable without making a duty of a switching element constituting the second power conversion unit variable. This configuration makes it possible to charge a battery by varying an input voltage thereto while fixing a duty of a switching element of the second power conversion unit, and therefore it is possible to avoid a reduction of DC/AC power conversion efficiency thereof in the case of charging the battery by varying an input voltage thereto, without raising a capability of a switching element constituting the second power conversion unit.

Meanwhile, the control unit may be configured to make a duty of a switching element constituting the second power conversion unit fixed at least during a period of time in which the terminal voltage of the battery is equal to or greater than the predetermined voltage at the time of charging the battery.

Or, the control unit may be configured to make a duty of a switching element constituting the second power conversion unit variable during a period of time until the terminal voltage of the battery becomes the predetermined voltage, thereby making an input voltage to the battery variable, at the time of charging the battery.

Or, a configuration may be such that the predetermined voltage is a terminal voltage of the battery, at which voltage the battery can be charged by a constant current or power when the active filter makes the input voltage to said second power conversion unit the lowest.

And a bidirectional DC/AC inverter according to the present invention comprises: a filter comprising a coil; a first bridge circuit, being constituted by plural switching elements, each of which is parallelly connected to a diode, and connected to the filter; a second bridge circuit, being constituted by plural switching elements, each of which is parallelly connected to a diode, and connected to the first bridge circuit; a capacitor, being installed between the first and second bridge circuits; a third bridge circuit, being constituted by plural switching elements, each of which is parallelly connected to a diode, and connected to the second bridge circuit by way of a transformer; and a control circuit for making the second bridge circuit function as converting a DC power into an AC power, and the first and third bridge circuits respectively function as converting an AC power into a DC power at the time of charging a battery, and for making the first and third bridge circuits respectively function as converting a DC power into an AC power, and the second bridge circuit function as converting an AC power into a DC power at the time of outputting an AC power from the aforementioned bidirectional DC/AC inverter, wherein the control circuit makes a predetermined switching element among individual switching elements, which constitute the first bridge circuit, the coil and the capacitor operate as an active filter at least during a period of time in which a terminal voltage of the battery is equal to or greater than a predetermined voltage, thereby making an input voltage to the second bridge circuit variable, at the time of charging the battery.

Or, the control circuit may be configured to make a duty of a switching element constituting the second bridge circuit variable during a period of time until the terminal voltage of the battery becomes the predetermined voltage, thereby making an input voltage to the battery variable, at the time of charging the battery.

Meanwhile, according to the present invention, a drive control method for a bidirectional DC/AC inverter which comprises a first power conversion unit; a second power conversion unit; a third power conversion unit; and a control unit for controlling respective operations of the first through third power conversion units, wherein the first power conversion unit converts an inputted AC power into a DC power, and the second power conversion unit converts the immediately aforementioned DC power into an AC power, and the third power conversion unit converts the immediately aforementioned AC power into a DC power for supplying a battery at the time of charging said battery, the third power conversion unit converts a DC power obtained from the battery into an AC power, and the second power conversion unit converts the immediately aforementioned AC power into a DC power, and the first power conversion unit converts the immediately aforementioned DC power into an AC power at the time of outputting an AC power from the aforementioned bi-directional DC/AC inverter, comprising: making a switching element and a capacitor, which constitute the first power conversion unit, and a coil, which constitutes a filter which is connected to the first power conversion unit, operate as an active filter at least during a period of time in which a terminal voltage of the battery is equal to or greater than a predetermined voltage, thereby making an input voltage to the second power conversion unit variable at the time of charging the battery.

Or, the drive control method for a bidirectional DC/AC inverter may be configured to make a duty of a switching element constituting the second power conversion unit variable during a period of time until the terminal voltage of the battery becomes the predetermined voltage, thereby making an input voltage to the battery variable, at the time of charging the battery.

The present invention is contrived to make it possible to avoid a reduction of DC/AC power conversion efficiency in the case of charging a battery by varying an input voltage thereto without raising a capability of a switching element constituting a bidirectional DC/AC inverter.

DESCRIPTION OF THE PREFERRED EMBODIMENT

The following is a description of the preferred embodiment of the present invention by referring to the accompanying drawings.

Figure 1:
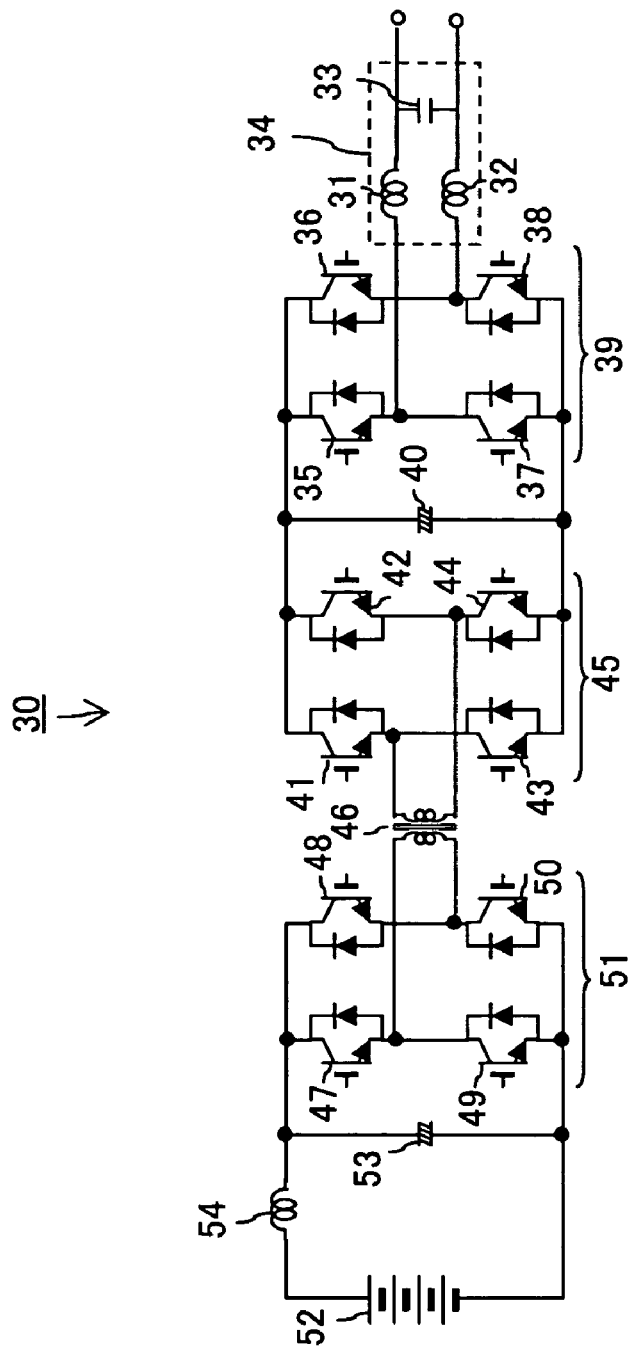
FIG. 1 is a diagram showing a conventional bidirectional DC/AC inverter.
Figure 2:
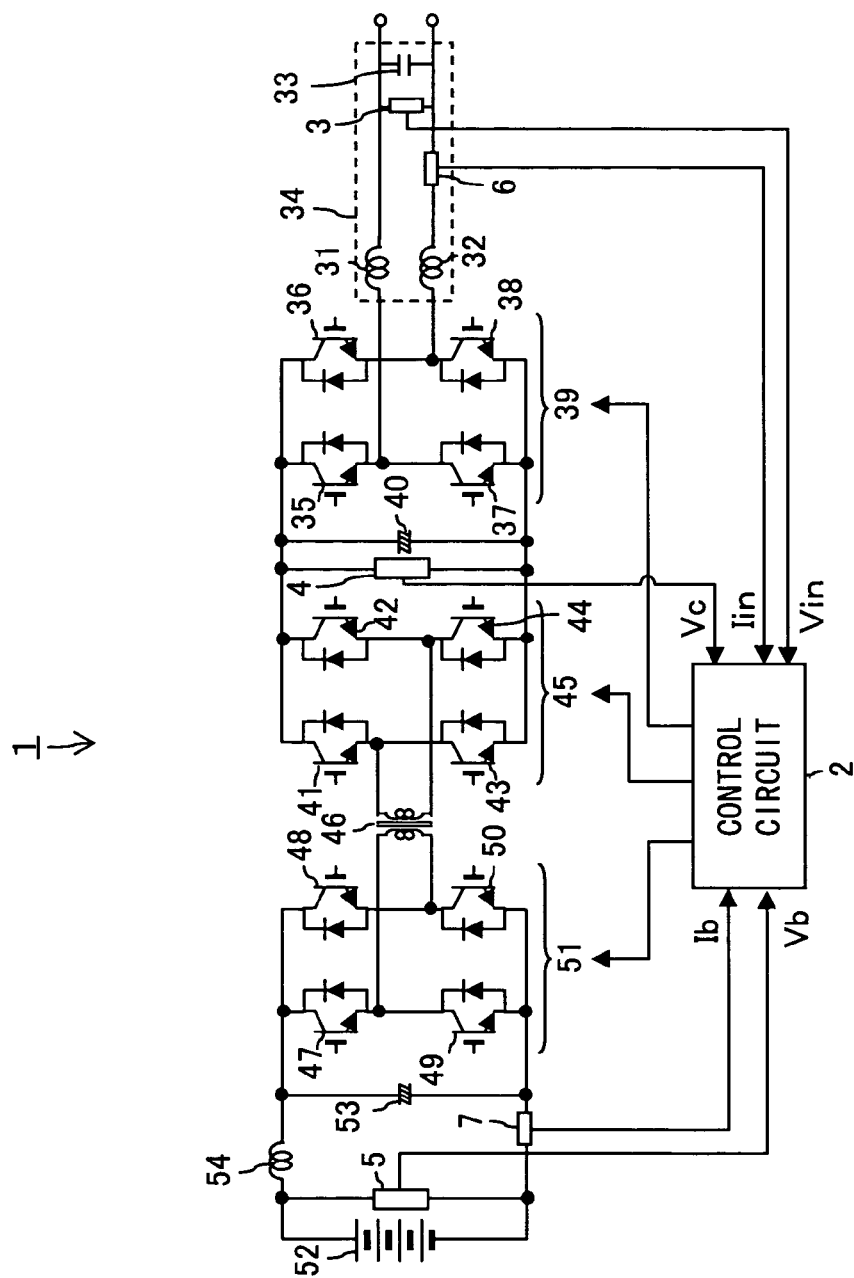
FIG. 2 is a diagram showing a bidirectional DC/AC inverter according to an embodiment of the present invention.

FIG. 2 is a diagram showing a bidirectional DC/AC inverter according to an embodiment of the present invention. Note that the same component signs, in showing FIG. 2, are allocated to those components common to the ones shown in FIG. 1.

The bidirectional DC/AC inverter 1 shown by FIG. 2 comprises a filter 34, a bridge circuit 39 (i.e., a first bridge circuit), a capacitor 40, a bridge circuit 45 (i.e., a second bridge circuit), a transformer 46, a bridge circuit 51 (i.e., a third bridge circuit), a capacitor 53, a coil 54, a control circuit 2 (i.e., a control unit) for driving switching elements 41 through 44 and switching elements 37 and 38 at the time of charging a battery 52, while driving switching elements 35 through 38 and switching elements 47 through 50 at the time of outputting an AC power from the bidirectional DC/AC inverter 1, a voltage detection circuit 3 for detecting an AC voltage Vin externally input to the filter 34, a voltage detection circuit 4 for detecting an input voltage Vc to the bridge circuit 45, a voltage detection circuit 5 for detecting a terminal voltage Vb of the battery 52, a current detection circuit 6 for detecting an AC current Iin externally input to the filter 34 and a current detection circuit 7 for detecting a current Ib flowing in the battery 52.

Note that the first power conversion unit noted in a claim of the present invention is constituted by the bridge circuit 39 and capacitor 40 at the time of charging the battery 52, while it is constituted by the bridge circuit 39 at the time of outputting an AC power from the bidirectional DC/AC inverter 1. Also note that the second power conversion unit noted in a claim of the present invention is constituted by the bridge circuit 45 at the time of charging the battery 52, while it is constituted by the bridge circuit 45 and capacitor 40 at the time of outputting an AC power from the bidirectional DC/AC inverter 1. Also note that the third power conversion unit noted in a claim of the present invention is constituted by the bridge circuit 51 and capacitor 53 at the time of charging the battery 52, while it is constituted by the bridge circuit 51 at the time of outputting an AC power from the bidirectional DC/AC inverter 1. Note also that each of the switching elements 35 through 38, of the switching elements 41 through 44 and of the switching elements 47 through 50 may be constituted by a metal oxide semiconductor field effect transistor (MOSFET) comprising a body diode. Also note that each of the bridge circuit 39, bridge circuit 45 and bridge circuit 51 may be constituted by a half bridge type bridge circuit comprising two switching elements.

The characteristic of the bidirectional DC/AC inverter 1 lies where the control circuit 2 makes the switching elements 37 and 38 on the lower side among the switching elements 35 through 38, which constitute the bridge circuit 39, the coils 31 and 32, which constitute the filter 34, and the capacitor 40 operate as an active filter, thereby making an input voltage Vc to the bridge circuit 45 variable at the time of charging the battery 52.

Figure 3A:
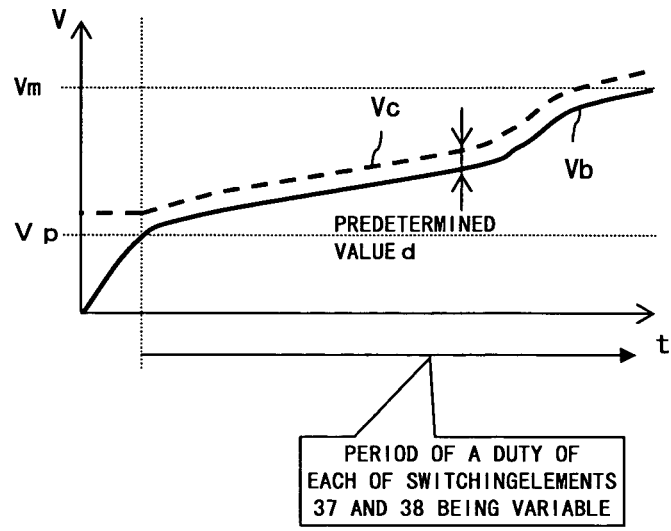
FIG. 3A is a diagram showing a relationship between an input voltage Vc to a bridge circuit and a terminal voltage Vb of a battery.

FIG. 3A is a diagram showing a relationship between an input voltage Vc to the bridge circuit 45 shown in FIG. 2 and a terminal voltage Vb of the battery 52. Note that the vertical axis of the graph shown by FIG. 3A indicates a voltage V, the horizontal axis indicates time t. The solid line shown in FIG. 3A indicates a terminal voltage Vb of the battery 52, and the dotted line indicates an input voltage Vc to the bridge circuit 45. An assumption here is that a terminal voltage Vb of the battery 52 at the start of a charging of it is sufficiently low. Also assumed here is that a predetermined voltage Vp is a terminal voltage Vb of the battery, at which voltage the battery can be charged by a constant current (in this embodiment, the input voltage Vc is higher than the terminal voltage Vb by a predetermined value d.) when the active filter which is constituted by the switching element 37 and 38, coils 31 and 32 and capacitor makes the input voltage Vc the lowest (i.e., when the active filter does not increase a voltage). Incidentally, the winding ratio of the primary and secondary coils of the transformer 46 shown in FIG. 2 is one to one (1:1).

As shown in FIG. 3A, the terminal voltage Vb of the battery 52 rapidly climbs to a predetermined voltage Vp shortly after the start of the charging, followed by climbing gradually and again rapidly at certain point in time until it reaches at an upper limit voltage Vm.

The control circuit 2 makes a duty of each of the switching element 37 and 38 so that the input voltage Vc to the bridge circuit 45 becomes constantly higher than the terminal voltage Vb of the battery 52 by a predetermined value d during a period of time from the terminal voltage of the battery 52 becoming a predetermined voltage Vp until it reaches at the upper limit voltage Vm, for example, as shown in FIG. 3A.

In the bidirectional DC/AC inverter 1 shown in FIG. 2 for example, when the switching element 37 is turned on and the switching element 38 is turned off, energy is accumulated in the coil 31, and when the switching element 37 is turned off and the switching element 38 is turned on, the energy accumulated in the coil 31 is then accumulated in the capacitor 40 by way of the diode parallelly connected to the switching element 35 if an AC power input to the filter 34 is positive. Meanwhile, when the switching element 37 is turned off and the switching element 38 is turned on, energy is accumulated in the coil 32 and when the switching element 37 is turned on and the switching element 38 is turned off, the energy accumulated in the coil 32 is then accumulated in the capacitor 40 by way of the diode parallelly connected to the switching element 36 if an AC power input to the filter 34 is negative. Therefore, increasing a duty of each of the switching elements 37 and 38 increases an input voltage Vc to the bridge circuit 45, while decreasing a duty of each of the switching elements 37 and 38 decreases the input voltage Vc to the bridge circuit 45.

This configuration makes it possible to make an input voltage Vc to the bridge circuit 45 variable in response to a change of the terminal voltage Vb of the battery 52 without changing a duty of any of the switching elements 41 through 44 of the bridge circuit 45, thereby enabling a duty of each of the switching elements 41 through 44 to be fixed at a value (e.g., approximately 50%) making DC/AC power conversion efficiency of the bridge circuit 45 the maximum during a period of time from the start of charging a battery 52 until a terminal voltage Vb thereof reaches at the upper limit voltage Vm.

Note that a duty of each of the switching elements 37 and 38 at the time of charging a battery 52 may be obtained based on a terminal voltage Vb of the battery 52 and a predetermined value d, or based on a current Ib flowing therein.

Also note that the switching elements 37 and 38 may be simultaneously turned on or off, or the switching elements 35 and 38 may be turned on or off alternatively with the switching elements 36 and 37 at the time of charging a battery 52.

Also note that the switching elements 37 and 38 may be stopped during a period of time from the start of charging a battery 52 until a terminal voltage Vb thereof reaches at a predetermined voltage Vp at the time of charging the battery 52.

Also note that the switching elements 37 and 38 maybe driven so that a phase of an input voltage waveform input to the bridge circuit 45 is identical with that of an input current waveform input thereto based on an AC voltage Vin and an AC current Iin which are input to the filter 34 at the time of charging the battery 52. This configuration enables a power factor, to be "1", of the active filter which is constituted by the switching elements 37 and 38, coils 31 and 32 and capacitor 40, thereby making it possible to improve efficiency of the active filter.

As described above, the bidirectional DC/AC inverter 1 makes the switching elements 37 and 38, coils 31 and 32 and capacitor 40 operate as an active filter, thereby making an input voltage Vc to the bridge circuit 45 variable at the time of charging the battery 52, and therefore it is possible to make an input voltage to the transformer 46 variable without changing a duty of any of the switching elements 41 through 44 of the bridge circuit 45. This configuration is capable of varying an input voltage to the battery 52 and charging it while fixing a duty of each of the switching elements 41 through 44 to a value making DC/AC power conversion efficiency of the bridge circuit 45 the maximum, and therefore it is possible to avoid a reduction of the DC/AC power conversion efficiency thereof without increasing a capability of the switching elements 41 through 44 in the case of charging the battery 52 by varying an input voltage thereto.

Note that the above described embodiment is configured to make a duty of each of the switching elements 41 through 44 of the bridge circuit 45 constantly fixed at the time of charging the battery 52, an alternative configuration, however, may be in a manner to make a duty of each of the switching elements 41 through 44 variable during a period of time from the start of charging a battery 52 until a terminal voltage Vb thereof reaches at a predetermined voltage Vp at the time of charging the battery 52.

Figure 3B:
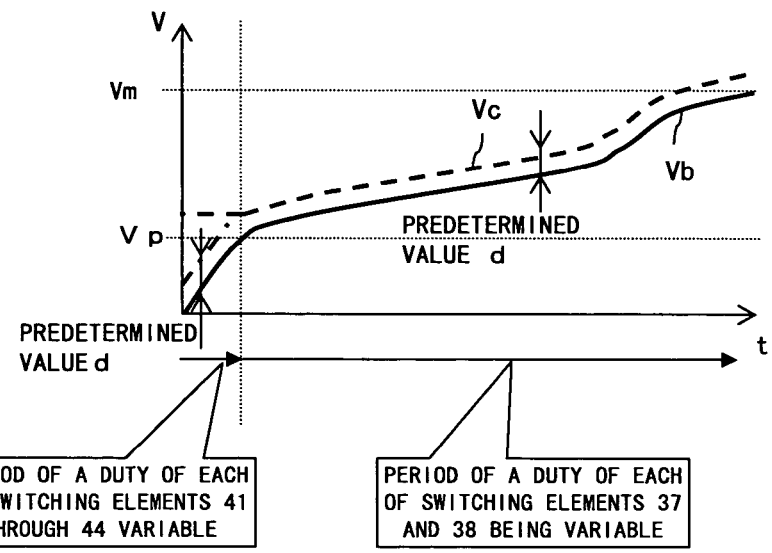
FIG. 3B is a diagram showing a relationship between an input voltage Vc to a bridge circuit and a terminal voltage Vb of a battery.

FIG. 3B is a diagram showing a relationship between an input voltage Vc to the bridge circuit 45 and a terminal voltage Vb of the battery 52 in the case of making a duty of each of the switching elements 41 through 44 variable during a period of time until a terminal voltage Vb of the battery 52 reaches at a predetermined voltage Vp. Note that the vertical axis of the graph shown in FIG. 3B indicates a voltage V, while the horizontal axis indicates time t. The solid line shown in FIG. 3B indicates a terminal voltage Vb of the battery 52, while the dotted line indicates an input voltage Vc to the bridge circuit 45. An assumption here is that a terminal voltage Vb of the battery 52 at the start of a charging of it is sufficiently low.

Also assumed here is that a predetermined voltage Vp is a terminal voltage Vb of the battery, at which voltage the battery can be charged by a constant current (in this embodiment, the input voltage Vc is higher than the terminal voltage Vb by a predetermined value d.) when the active filter which is constituted by the switching element 37 and 38, coils 31 and 32 and capacitor makes the input voltage Vc the lowest (i.e., when the active filter does not increase a voltage). Incidentally, the winding ratio of the primary and secondary coils of the transformer 46 shown in FIG. 2 is one to one (1:1).

The terminal voltage Vb of the battery 52 shown in FIG. 3B rapidly climbs to a predetermined voltage Vp shortly after the start of the charging, followed by climbing gradually and again rapidly at a certain point in time until it reaches at the upper limit voltage Vm as in the case of the terminal voltage Vb of the battery 52 shown in FIG. 3A.

The control circuit 2 for example makes a duty of each of the switching elements 41 through 44 of the bridge circuit 45 variable so that an input voltage to the battery 52 (which is shown by a single dot chain line in FIG. 3B) is constantly higher than a terminal voltage Vb of the battery 52 by a predetermined value d during a period of time from the start of charging the battery 52 until a terminal voltage Vb thereof reaches at a predetermined voltage Vp, and also makes a duty of each of the switching elements 41 through 44 fixed at a value (e.g., approximately 50%) making DC/AC power conversion efficiency of the bridge circuit 45 the maximum during a period of time from a terminal voltage Vb of the battery 52 becomes a predetermined voltage Vp until it reaches at the upper limit voltage Vm.

Note that the drive control for the switching elements 37 and 38 at the time of charging the battery 52 is the same as one described in association with FIG. 3A.

This configuration enables an input voltage to the battery 52 to be variable even in a period of time (e.g., a period of time from the start of charging the battery 52 until a terminal voltage thereof reaches at a predetermined voltage Vp) in which an input voltage Vc to the bridge circuit 45 cannot be varied by the active filter which is constituted by the switching elements 37 and 38, coils 31 and 32 and capacitor 40, thereby making it possible to charge a battery 52 having a small capacity, low output current.

Although the above described embodiment is configured to charge a battery 52 in a manner to make an input current thereto constant, an alternative configuration may be to charge the battery 52 by a constant input power thereto.

Although the above described embodiment is configured so that the winding ratio of the primary and secondary coils of the transformer 46 is 1:1, the configuration is not limited as such. Although a duty of each of the switching elements 41 through 44 is fixed to a value making DC/AC power conversion efficiency of the bridge circuit 45 the maximum during a period of time from the terminal voltage Vb of the battery 52 becoming a predetermined voltage Vp until it reaches at the upper limit voltage Vm, it is not limited by a value making it the maximum.

What is claimed is:

1. A bidirectional DC/AC inverter, comprising:
   a first power conversion unit;
   a second power conversion unit;
   a third power conversion unit; and
   a control unit for controlling respective operations of the first through third power conversion units,
   wherein the first power conversion unit converts an inputted AC power into a DC power, and the second power conversion unit converts the immediately aforementioned DC power into an AC power, and the third power conversion unit converts the immediately aforementioned AC power into a DC power thereby supplying the DC power to a battery at the time of charging said battery,
   the third power conversion unit converts a DC power obtained from the battery into an AC power, and the second power conversion unit converts the immediately aforementioned AC power into a DC power, and the first power conversion unit converts the immediately aforementioned DC power into an AC power thereby outputting the AC power from the aforementioned bi-directional DC/AC inverter, and
   the control unit makes a switching element, a capacitor, which constitute the first power conversion unit, and a coil, which constitutes a filter which is connected to the first power conversion unit, operate as an active filter at least during a period of time in which a terminal voltage of the battery is equal to or greater than a predetermined voltage, thereby making an input voltage to the second power conversion unit adjustable at the time of charging the battery.

2. The bidirectional DC/AC inverter according to claim 1, wherein said control unit makes a duty of a switching element constituting said second power conversion unit fixed at least during a period of time in which the terminal voltage of said battery is equal to or greater than said predetermined voltage at the time of charging the battery.

3. The bidirectional DC/AC inverter according to claim 1, wherein said control unit makes a duty of a switching element constituting said second power conversion unit variable during a period of time until the terminal voltage of said battery becomes said predetermined voltage, thereby making an input voltage to the battery variable, at the time of charging the battery.

4. The bidirectional DC/AC inverter according to claim 2, wherein said control unit makes a duty of a switching element constituting said second power conversion unit variable during a period of time until the terminal voltage of said battery becomes said predetermined voltage, thereby making an input voltage to the battery variable, at the time of charging the battery.

5. The bidirectional DC/AC inverter according to claim 3, wherein said predetermined voltage is a terminal voltage of said battery, at which voltage the battery can be charged by a constant current or power when the active filter makes the input voltage to said second power conversion unit the lowest.

6. The bidirectional DC/AC inverter according to claim 4, wherein said predetermined voltage is a terminal voltage of said battery, at which voltage the battery can be charged by a constant current or power when the active filter makes the input voltage to said second power conversion unit the lowest.

7. A bidirectional DC/AC inverter, comprising:
a filter comprising a coil;
a first bridge circuit, being constituted by plural switching elements, each of which is connected to a diode in parallel, and connected to the filter;
a second bridge circuit, being constituted by plural switching elements, each of which is connected to a diode in parallel, and connected to the first bridge circuit;
a capacitor, being installed between the first and second bridge circuits;
a third bridge circuit, being constituted by plural switching elements, each of which is connected to a diode in parallel, and connected to the second bridge circuit by way of a transformer; and
a control circuit for making the second bridge circuit function as converting a DC power into an AC power, and the first and third bridge circuits respectively function as converting an AC power into a DC power at the time of charging a battery, and for making the first and third bridge circuits respectively function as converting a DC power into an AC power, and the second bridge circuit function as converting an AC power into a DC power at the time of outputting an AC power from the aforementioned bidirectional DC/AC inverter,
wherein the control circuit makes a predetermined switching element among individual switching elements, which constitute the first bridge circuit, the coil and the capacitor operate as an active filter at least during a period of time in which a terminal voltage of the battery is equal to or greater than a predetermined voltage, thereby making an input voltage to the second bridge circuit adjustable, at the time of charging the battery.

8. The bidirectional DC/AC inverter according to claim 7, wherein said control circuit makes a duty of a switching element constituting said second bridge circuit variable during a period of time until the terminal voltage of said battery becomes said predetermined voltage, thereby making an input voltage to the battery variable, at the time of charging the battery.

9. A drive control method for a bidirectional DC/AC inverter which comprises:
a first power conversion unit;
a second power conversion unit;
a third power conversion unit; and
a control unit for controlling respective operations of the first through third power conversion units,
wherein the first power conversion unit converts an inputted AC power into a DC power, and the second power conversion unit converts the immediately aforementioned DC power into an AC power, and the third power conversion unit converts the immediately aforementioned AC power into a DC power thereby supplying the DC power to a battery at the time of charging said battery,
the third power conversion unit converts a DC power obtained from the battery into an AC power, and the second power conversion unit converts the immediately aforementioned AC power into a DC power, and the first power conversion unit converts the immediately aforementioned DC power into an AC power thereby outputting the AC power from the aforementioned hi-directional DC/AC inverter, comprising:
making a switching element, a capacitor, which constitute the first power conversion unit, and a coil, which constitutes a filter which is connected to the first power conversion unit, operate as an active filter at least during a period of time in which a terminal voltage of the battery is equal to or greater than a predetermined voltage, thereby making an input voltage to the second power conversion unit adjustable at the time of charging the battery.

10. The drive control method for a bidirectional DC/AC inverter according to claim 9, making a duty of a switching element constituting said second power conversion unit variable during a period of time until the terminal voltage of said battery becomes said predetermined voltage, thereby making an input voltage to the battery variable, at the time of charging the battery.

* * * * *